(12) United States Patent
Couturier et al.

(10) Patent No.: US 7,478,155 B2
(45) Date of Patent: Jan. 13, 2009

(54) METHOD FOR INTERCEPTING CONTROL DATA, IN PARTICULAR QUALITY OF SERVICE DATA, AND ASSOCIATED DEVICE

(75) Inventors: Alban Couturier, Chatillon (FR); Franck Jouenne, Ozoir-la-Ferriere (FR)

(73) Assignee: Alcatel, Paris (FR)

( * ) Notice: Subject to any disclaimer, the term of this patent is extended or adjusted under 35 U.S.C. 154(b) by 825 days.

(21) Appl. No.: 10/664,864

(22) Filed: Sep. 22, 2003

(65) Prior Publication Data
US 2004/0057436 A1 Mar. 25, 2004

(30) Foreign Application Priority Data
Sep. 23, 2002 (FR) .................................. 02 11722

(51) Int. Cl.
*G06F 15/173* (2006.01)
(52) U.S. Cl. .................... 709/224; 370/229; 370/236.2; 370/241.1; 370/395.21; 370/252
(58) Field of Classification Search ........................ None
See application file for complete search history.

(56) References Cited

U.S. PATENT DOCUMENTS

| | | | | |
|---|---|---|---|---|
| 6,091,709 | A * | 7/2000 | Harrison et al. .............. | 370/235 |
| 6,108,782 | A | 8/2000 | Fletcher et al. | |
| 6,122,665 | A * | 9/2000 | Bar et al. ..................... | 709/224 |
| 6,501,763 | B1 * | 12/2002 | Bhagavath et al. ........... | 370/432 |
| 6,529,475 | B1 * | 3/2003 | Wan et al. .................... | 370/231 |
| 6,678,250 | B1 * | 1/2004 | Grabelsky et al. ............ | 370/241 |
| 6,678,267 | B1 * | 1/2004 | Anandakumar et al. ...... | 370/356 |
| 6,691,167 | B2 * | 2/2004 | Procopio et al. ............. | 709/235 |
| 6,757,256 | B1 * | 6/2004 | Anandakumar et al. ...... | 370/252 |
| 6,771,594 | B1 * | 8/2004 | Upadrasta .................... | 370/228 |
| 6,952,406 | B2 * | 10/2005 | Procopio ..................... | 370/252 |
| 7,161,947 | B1 * | 1/2007 | Desai .......................... | 370/401 |
| 7,376,731 | B2 * | 5/2008 | Khan et al. .................. | 709/224 |
| 2002/0032774 | A1 * | 3/2002 | Kohler et al. ................ | 709/225 |
| 2002/0114274 | A1 * | 8/2002 | Sturges et al. ............... | 370/229 |
| 2003/0016630 | A1 * | 1/2003 | Vega-Garcia et al. ........ | 370/252 |
| 2003/0120789 | A1 * | 6/2003 | Hepworth et al. ........... | 709/230 |
| 2004/0148417 | A1 * | 7/2004 | Roh et al. .................... | 709/230 |

OTHER PUBLICATIONS

Merwe Van Der Je et al: "MMDUMP: A Tool for Monitoring Internet Multimedia Traffic" Computer Communications Review, Association for Computing Machinery, New York, US, vol. 30, No. 5, Oct. 2000, pp. 48-59, XP001066404.
Davit Bacher, Andrew Swan, Lawrence A. Rowe: "rtpmon: A Third-Party RTCP Monitor" Sep. 10, 1996, XP002244413.
Sharma V: "Estimating traffic intensities at different nodes in networks via a probing stream" vol. 1A, Dec. 5, 1999, pp. 374-380, XP010373329.

* cited by examiner

*Primary Examiner*—Bunjob Jaroenchonwanit
*Assistant Examiner*—Dohm Chankong
(74) *Attorney, Agent, or Firm*—Sughrue Mion, PLLC

(57) ABSTRACT

A device comprises interception means (2) capable, in the case of transfer of data packets between at least two remote terminals (Tij-k), via a communications network, of intercepting at least certain of the control packets during the transfer, and of determining amongst the intercepted control packets those which are formatted according to a chosen real-time data transfer control protocol, and management means (3) capable of duplicating at least part of each intercepted control packet, and of generating data, representing the duplicated part, intended to be communicated to control means (1) located in a control application (S) of the network.

31 Claims, 1 Drawing Sheet

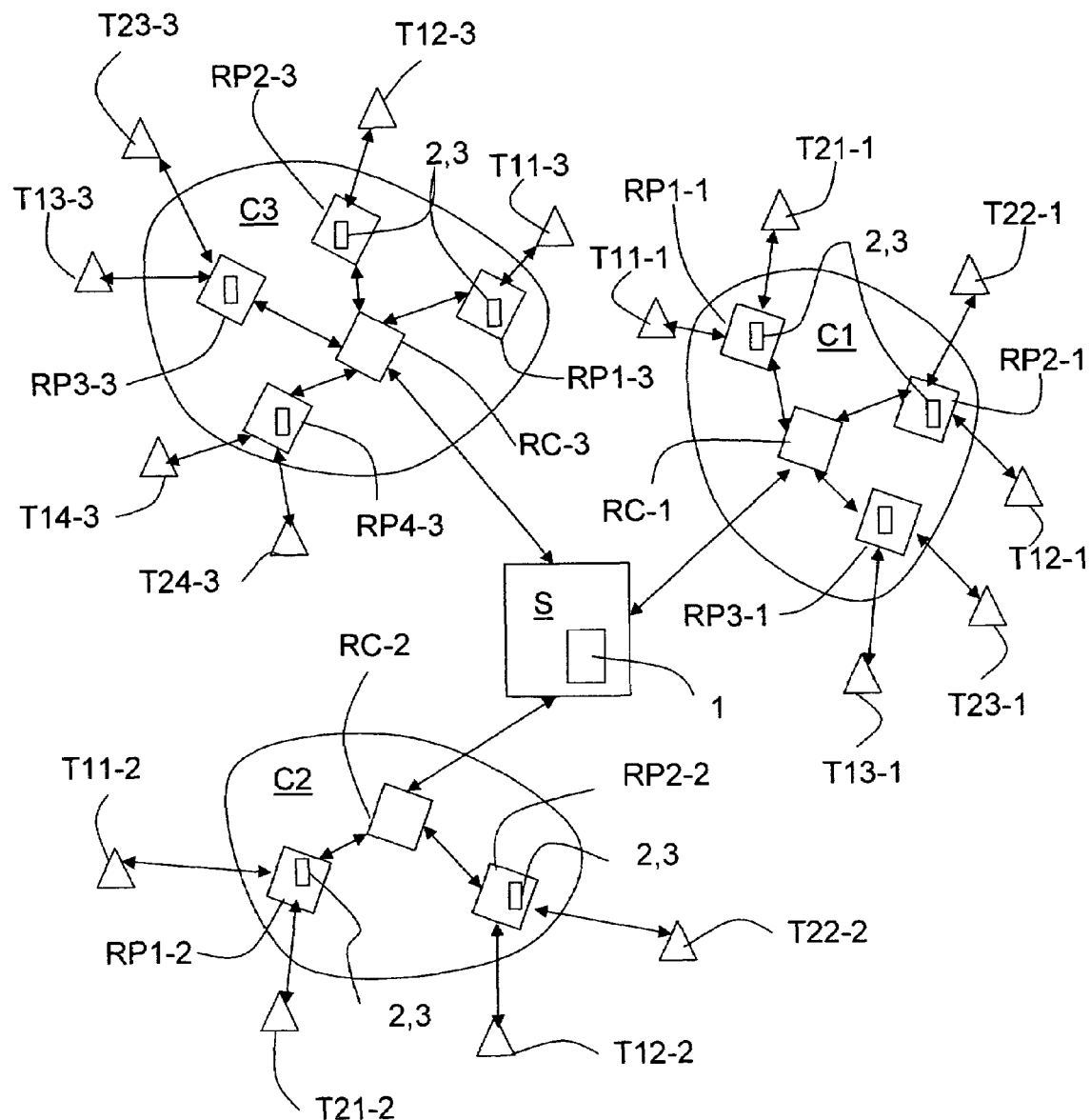

METHOD FOR INTERCEPTING CONTROL DATA, IN PARTICULAR QUALITY OF SERVICE DATA, AND ASSOCIATED DEVICE

FIELD OF THE INVENTION

The invention relates to the field of communications between terminals within a network, and more particularly that of control of the data exchanged between terminals.

BACKGROUND OF THE INVENTION

Certain operators or access providers have developed methods (or applications) allowing their clients to exchange data packets within a communications network under preferential conditions (or with a certain quality of service level). In order to allow these clients to check (or control) the actual transfer conditions of data of "stream" type, in particular dedicated to video and voice, and transported, for example, according to the RTP protocol (Real-time Transfer Protocol), the RTCP protocol (Real-time Transfer Control Protocol) is used. This protocol, developed for controlling the real-time transfer of data (especially audio and/or video), allows in particular the sender of a stream to receive, in real time, information characterising the data transfer, such as the percentage of data packets lost, or the variation in packet transmission time. The RTP protocol encapsulates the data, numbers and timestamps the packets, and RTCP packets are sent back by the receiver of the RTP stream to the sender, in order to communicate thereto information on the transfer, principally the number of RTP packets lost.

Users, who have possibly paid in order to have preferential conditions, can thus, when they are not satisfied, question their operator (or their service provider) in order to obtain explanations, or discounts. However, in the case of microstreams (or data exchanges between two end users), such as for example conventional video sessions on the Internet, operators find it difficult to access (in real time or off-line) statistics relating to the quality of the communication, so that they cannot know that a quality problem has appeared, and therefore cannot react in an appropriate manner (possibly disproving the complainant).

The aim of the invention is therefore to remedy this drawback.

SUMMARY OF THE INVENTION

To that end it proposes a method for intercepting control data exchanged by remote terminals, via a communications network, in the form of control packets formatted according to a first real-time data transfer control protocol (such as for example RTCP) and associated with data previously exchanged by these terminals (generally in the form of packets formatted according to a second real-time data transfer protocol (such as for example RTP)). The invention relates to the interception of at least some of the control packets, which are formatted according to the first protocol and which are in the process of being transferred, with a view to communication, immediate or delayed, to a control application located in the network, after total or partial duplication, of data representing the duplicated parts, so that the control application deduces therefrom information on the transfer (in particular the quality of service in the case of the RTCP protocol).

"Duplication" means here the fact of retrieving data in order to transmit them to an application, but also the fact of storing these data in so-called log files with a view to off-line processing.

By virtue of this device, based on duplication with possible selection of data, operators (or access providers) can have available in real time (or off-line) the same transfer information as their clients.

The method according to the invention can comprise many additional characteristics which can be taken separately and/or in combination, and in particular:

- interception of all the control (for example RTCP) packets transferred, or of one packet out of n (n being a chosen integer value);
- determination of the packets in which at least the network address field for the terminal which sent the packet, the network address field for the destination terminal of the packet, the destination port field and/or the source port field, and the protocol (such as for example UDP) number field, have chosen values (or filters). These chosen values (or filters) are preferentially transmitted by an application (possibly the destination control application for the duplicated data) and/or from another item of equipment in the network;
- between interception and duplication, comparison between a chosen threshold value and the value of a service information field contained in the intercepted control packet (comprising, preferably, data representing the quality of service), in order to intercept/duplicate only control packets in which the service information field has a value substantially greater than the threshold value (notion of filtering). In this case, the whole of each intercepted control packet (therefore formatted according to the first protocol) and having a service information field with a value substantially greater than the threshold value may be duplicated, in order to communicate the whole of the duplicated control packet. In a variant, only certain chosen fields contained in each intercepted control packet (therefore formatted according to the first protocol) and having a service information field with a value substantially greater than the threshold value may be duplicated, in order to communicate only the duplicated fields. Preferentially, in this variant, the service information field or fields are also duplicated, in order to communicate it or them with the other duplicated fields. In a variant, instead of communicating the service information field or fields, information data which represent it or them are communicated;
- duplication (without filtering) of the whole of each intercepted control packet (therefore formatted according to the first protocol) or, in a variant, of certain chosen fields contained in each intercepted control packet (therefore formatted according to the first protocol), including at least the service information field or fields. In a variant, instead of communicating the service information field or fields, information data which represent it or them are communicated;
- preferential duplication of the detected fields of the network address for the terminal which sent the packet, the network address for the destination terminal of the packet, the destination port and/or the source port, and the protocol number.

The invention also relates to a device for intercepting control data exchanged by remote terminals, via a communications network, in the form of control packets formatted according to a first real-time data transfer control protocol (such as for example RTCP) and associated with data previously exchanged by these terminals (generally in the form of packets formatted according to a second real-time data transfer protocol (such as for example RTP)).

More precisely, the device is characterised by the fact that it comprises, on the one hand, interception means capable, in the case of transfer of control data packets between at least two remote terminals, of intercepting those which are formatted according to the first protocol, and, on the other hand, management means capable of duplicating at least part of each intercepted control packet, and of generating data representing the duplicated part, in order that they are communicated (immediately or delayed) to control means located in a control application of the network.

The device according to the invention can comprise many additional characteristics which can be taken separately and/or in combination, and in particular:

interception means organised for intercepting all the control packets transferred with a view to determining their format, or else only one packet out of n (n being a chosen integer value), after having sampled (or filtered) the control packets;

interception means organised, on the one hand, for detecting from amongst all the packets those in which at least the address fields designating the terminal which sent the packet, the destination terminal of the packet, the destination port and/or the source port, and the protocol number have chosen values, and, on the other hand, for retaining the packets having these chosen values (or filters), these then being referred to as "intercepted control packets". These chosen values (or filters) are preferentially transmitted to the device by an application (possibly the destination control application for the duplicated data) or from another item of equipment in the network;

interception means organised for detecting at least a service information field contained in each intercepted control packet, and for performing, between interception and duplication, a comparison between a stored chosen threshold value and the value of the detected service information field (comprising data representing the quality of service in the case of the RTCP protocol, in particular), so that the management means duplicate only the part at least of the control packet in which the service information field has a value substantially greater than the threshold value. In this case, the interception means are preferentially organised for communicating to the management means the whole of each intercepted control packet having a service information field with a value substantially greater than the threshold value, and the management means are preferentially organised for duplicating the whole of each intercepted control packet received and communicating to the control means the whole of the duplicated control packet. In a variant, the interception means are organised for communicating to the management means certain chosen fields contained in each intercepted control packet having a service information field with a value substantially greater than the threshold value, and the management means are organised for duplicating the chosen fields of each intercepted control packet received and communicating the duplicated fields to the control means. Preferentially, in this variant, the management means also duplicate the service information field or fields, in order to communicate it or them with the other duplicated fields. In a variant, instead of communicating the service information field or fields, the management means communicate information data which represent it or them;

management means organised for duplicating certain chosen fields contained in each intercepted control packet (therefore formatted according to the first protocol), including at least a service information field. Preferentially, the management means are organised for communicating, with the other duplicated fields, information data representing the duplicated service information field;

management means organised for duplicating the detected fields of the network address for the terminal which sent the intercepted control packet, the network address for the destination terminal of the intercepted packet, the destination port and the protocol number, and for communicating these duplicated fields to the control means;

management means organised for duplicating the whole of each intercepted packet (therefore formatted according to the first protocol), and for communicating to the control means the whole of the duplicated control packet;

interception means and/or management means located in at least one of the items of network equipment through which the streams intended for the terminals flow. The equipment can be, for example, a firewall, a router, a NAT box (RFC 2663 and RFC 3022) or a traffic manager such as a traffic shaper.

The invention can be used in any type of communications network, private or public, and in particular in Internet networks. Furthermore, the first and second protocols according to which the data packets are formatted are preferentially the RTCP and RTP protocols, respectively. Moreover, the duplicated data can be communicated according to the COPS or SNMP protocol or, better still, according to an encapsulation protocol taking the retained RTCP packets and integrating them as they are into other packets, sent directly, immediately or delayed, to the verification application.

Other characteristics and advantages of the invention will emerge from an examination of the following detailed description, and of the accompanying drawing in which the single FIGURE illustrates schematically a communications installation equipped with a device according to the invention. This drawing can serve, not only to add to the invention, but also to contribute towards its definition, if need be.

BRIEF DESCRIPTION OF THE DRAWING

The single FIGURE schematically illustrates a communications installation equipped with a device according to an exemplary embodiment of the invention.

DETAILED DESCRIPTION OF THE INVENTION

The communications installation illustrated in the single FIGURE comprises first of all a server S connected to a communications network, partially embodied by two-way arrows. As a non-limiting example, it is considered in the following description that the network is the public Internet network in which the data are exchanged according to the IP protocol.

As illustrated, in this example the network comprises central routers RC-k connected to the server S and to a multiplicity of edge routers RPj-k. User terminals Tij-k are connected to the various edge routers RPj-k. These terminals are either fixed or mobile. They can be, for example, fixed or portable computers, fixed or portable telephones, or personal digital assistants (PDAs).

Furthermore, it is considered that the terminals can exchange in real time, with other terminals, audio and/or video over IP (VoIP) sessions or multimedia over IP (MMoIP) sessions. It is also considered that these terminals use the RTP protocol (Real-time Transfer Protocol) and RTCP protocol (Real-time Transfer Control Protocol) for exchanging the multimedia streams.

As these protocols are well known to persons skilled in the art, they will not be presented in detail. Their main functions and characteristics are simply noted here.

The RTP protocol makes it possible to provide a uniform means of transmission over IP of data subject to constraints of real-time transfer, either "point to point" (or "unicast"; a micro-stream between two terminals), or "multipoint" (or "multicast"; a stream from one terminal to several terminals). It uses IP packet sequence numbers which make it possible to reconstruct audio and/or video information, including when the network changes the order of the packets. RTP thus makes it possible to add time markers or sequence numbers to the data packets, to identify the type of information transported (unique synchronisation source identifier (SSRC)) and to control the arrival of the packets at their destination.

RTP is a protocol using the UDP (User Datagram Protocol) underlying transport protocol. The RTCP protocol makes it possible to control the RTP streams. It is based on periodic transmissions of control packets by the different participants in a session. It therefore makes it possible to convey information on the participants and on the quality of service (QoS). More precisely, it makes it possible to provide feedback for a source (terminal); in addition it makes it possible to reveal individual or group distribution faults; it also makes it possible to keep a trace of the different participants (by virtue of a unique and permanent identifier for each participant (CNAME) and a synchronisation source identifier (SSRC)); it also makes it possible to control the rate at which the participants in an RTP session transmit their RTCP packets; finally it makes it possible to transmit control information on the session (for example in order to identify a participant on the screens of the other participants).

RTP and RTCP use separate ports of a pair of ports (usually the even port for RTP and the odd port immediately above for RTCP).

As explained in the introduction, the invention relates to the interception of at least part of the RTCP control packet stream in the process of being transferred within the network. In the following description, "RTCP control packet" will mean a control data packet formatted according to the (first) RTCP protocol. Similarly, "RTP packet" will mean a data packet formatted according to the (second) RTP protocol.

It is a question in effect of detecting all the RTCP control packets, or only some of them, in order to communicate them, after total or partial duplication, either substantially in the same form or in the form of data which represent them, to a control application 1 located in the network, for example in the server S of the operator or the access provider of the users. This control application 1 can be a call control server (such as "SIP proxy" or "H.323 gatekeeper"), or any other type of equivalent controller, such as for example a passband controller, whether in hardware or software form. The control application 1 can then deduce therefrom information on the transfer of the data packets, such as for example the quality of service (QoS), defined by one or more service information data fields (higher number of packets received, number of packets lost, transfer time between terminals, jitter between successive arrivals).

In order to achieve this objective, there is provided, first of all, at least one interception module 2 (hereinafter referred to as a filter) located in at least one of the routers in the network. As interception of the RTCP control packets is expensive to implement (in particular owing to the large number of micro-stream filterings in a core router), it is preferable to perform it in items of equipment, such as the routers, close to the terminals.

Preferentially, the filter 2 intercepts all control packets liable to be formatted according to the RTCP protocol. But, in a variant, it can perform a sampling (or filtering) of the control packets, so as to intercept only one control packet out of n (n being a chosen integer value, for example equal to 2 or 3).

As the object of the interception is to "retain" only RTCP control packets, the filter 2 must consequently analyse the packets in the process of being transferred. This analysis concerns preferentially checking the values of at least four (perhaps even five) fields: the protocol number field in the IP header (the value must be UDP), the network address field for the terminal which sent the packet, the network address field for the destination terminal of the packet, and the destination port field and/or the source port field. A packet which has at least four (perhaps even five) chosen field values is a candidate for interception.

These chosen values (also referred to as filters) are preferentially transmitted to the device (and in particular to its filter 2) by an application, which is possibly the control application 1 which is the destination for the duplicated data, or by another item of equipment in the network. These filters (or chosen values) can be transmitted according to a protocol such as COPS.

The device according to the invention also comprises at least one management module 3 located in an item of network equipment, for example the one which comprises the interception module 2, with which it then constitutes the filter (as illustrated). In the following description, filter will designate both the interception module 2 and the management module 3.

Each management module 3 is designed to duplicate at least part of each control packet intercepted and then communicated by the interception module 2 with which it is associated, and to generate data representing the duplicated part, in order that they are communicated to the control application 1. Communication of the duplicated part can be immediate or delayed. In the delayed case, the duplicated parts are stored in log files before being communicated to the control application 1.

Between the interception and duplication steps, a filtering step can be provided, consisting in communicating, with a view to duplication, only the RTCP control packets comprising a service information field with a value greater than a threshold value. This is because it can be considered that, below this threshold value, the quality of service is acceptable and therefore it is not necessary to feed back the information to the control application 1. For example, the threshold value relating to the percentage of lost packets is chosen equal to 1%, so that any RTCP control packet having a loss greater than 1% forms the subject of a "report" by duplication.

It is quite obvious that this notion of threshold is relative. The comparison can in fact be carried out on the value of the percentage of packets transmitted. In this case, there would be communicated, with a view to duplication, only the RTCP control packets comprising a service information field with a value less than a threshold value, for example 99%.

Furthermore, the filtering can concern the values of several service information fields. In this case, a threshold value is provided for each field having to be subject to a comparison.

In order to perform the filtering, the interception module 2 is therefore organised so as to detect the service information field, the object of the comparison, contained in the intercepted packets, and then to extract its value in order to compare it with the stored chosen threshold value. Once the comparison has been performed, the processing of the packet continues normally in the router (or network equipment) and a copy of at least part of the packet is communicated to the management module 3 depending on whether the value of its service information field is less than or greater than the threshold.

Preferentially, the management module 3 duplicates everything it has received from the interception module 2, whether this is the whole of a control packet or only parts thereof. But in a variant it can be envisaged that the management module 3 is organised so as to duplicate only some of the data it has received. This situation can in particular be envisaged when the interception module 2 communicates to it the whole of the intercepted control packet. On the other hand, this solution is not of real interest when the interception module transmits only part of the intercepted control packet, for example the network address field for the terminal which sent the packet, the network address field for the destination terminal of the packet, the destination port field, the protocol number field, and the service information field or fields contained in the packet.

It is important to note that the management module 3 can be organised so as to communicate information data which represent the service information field or fields, rather than the contents of these fields. For example, a field can be replaced by an alarm or a bit whose 0 or 1 value indicates that an RTP packet has been lost or transmitted.

Transmission (or communication) of the duplicated elements, originating from the RTCP control packets, between the management module 3 and the control application 1 can be performed by any appropriate means. Use can be made for example of the COPS (Common Open Policy Service—RFC 2748) protocol coupled with a packet duplication request PIB (Policy Information Base), or the SNMP (Simple Network Management Protocol—RFC 1157) network management and administration protocol coupled with an MIB (Management Information Base), or the CMIS/CMIP protocol also coupled with an MIB.

The interception, management and control modules can be respectively implemented in the form of electronic circuits, software (or computer) modules, or a combination of circuits and software. Furthermore, the management and interception modules can be grouped together in one and the same module forming a filter.

Furthermore, the device can be configurable as a function of the users. In fact, a number of different threshold levels associated with different categories of service can be envisaged.

Moreover, the modules presented above, which constitute the device according to the invention, can be located in any type of equipment in the network given that this equipment is installed on the path of the control packets formatted according to the first protocol (here RTCP). Amongst these items of equipment, there can in particular be cited routers (edge or core), firewalls, NAT boxes (Network Address Translation boxes) or Traffic Shapers (traffic managers).

In addition, it is possible to use the control application, for example located in the server S, for transmitting filters (for example the four (perhaps even five) chosen values of the aforementioned fields and/or threshold values) to the items of equipment in which the modules constituting the device according to the invention are located.

The invention also offers a method for intercepting the control data exchanged by remote terminals, via a communications network, in the form of control packets formatted according to a first real-time data transfer control protocol (such as for example RTCP) and associated with data previously exchanged by these terminals (generally in the form of packets formatted according to a second real-time data transfer protocol (such as for example RTP)).

This can be implemented by means of the device presented above. As the main and optional functions and sub-functions provided by the steps of this method are substantially identical to those provided by the various means constituting the device, only the steps implementing the main function of the method according to the invention will be summarised below.

This method comprises a step in which i) at least certain of the control data packets which are in the process of being transferred on the network between at least two remote terminals are intercepted, so as to determine those which are formatted according to the first protocol (here RTCP), then ii) at least part of each control packet thus formatted is duplicated, and iii) data representing the duplicated part are communicated to a control application located in the network, so that it deduces therefrom information on the transfer (and principally the quality of service in the case of the RTCP protocol).

The invention is not limited to the embodiments of the methods and devices described above, solely by way of examples, but it includes all the variants that can be envisaged by persons skilled in the art within the context of the following claims.

What is claimed is:

1. A method for intercepting data exchanged by remote terminals via a communications network, said data including control packets formatted according to a first real-time data transfer control protocol and associated with data previously exchanged by said terminals, the method comprising:
    intercepting at least certain data packets of a transfer between at least two remote terminals, during said transfer, so as to determine which of said data packets are control packets, said control packets being formatted according to said first protocol;
    duplicating at least part of each of said control packets;
    communicating data representing said duplicated part of each of said control packets to a control application located in said network, said control application deducing information on said transfer from said communicated data;
    between said intercepting and said duplicating, performing a comparison between a chosen threshold value and the value of a service information field contained in the intercepted control packet;
    wherein said duplicating comprises duplicating only the part of the control packet in which the service information field has a value greater than said chosen threshold value;
    wherein certain chosen fields contained in each intercepted control packet, formatted according to the first protocol and in which the service information field has a value greater than said chosen threshold value, are duplicated, and said duplicated chosen fields are communicated; and
    wherein said service information field is also duplicated, and information data representing said duplicated service information field are communicated with said duplicated chosen fields.

2. The method according to claim 1, wherein all the control packets of said transfer between at least two remote terminals are intercepted.

3. The method according to claim 1, wherein the control packets are sampled so as to intercept only one sample from amongst n, n being a chosen integer value.

4. The method according to claim 1, wherein determination of the formatting according to the first protocol concerns the determination, amongst the packets, of those in which at least a network address field for the terminal which sent the packet, a network address field for the destination terminal of the packet, a destination port field and/or a source port field, and a protocol number field have chosen values.

5. The method according to claim 4, wherein said chosen values are communicated by an application and/or an item of equipment in the network.

6. The method according to claim 1, further comprising:
between said intercepting and said duplicating, performing a comparison between a chosen threshold value and the value of a service information field contained in the intercepted control packet;
wherein the whole of each intercepted control packet, formatted according to the first protocol and in which the service information field has a value greater than said chosen threshold value, is duplicated, and the whole of said duplicated control packet is communicated.

7. The method according to claim 1, wherein one of the duplicated and communicated chosen fields is said service information field.

8. The method according to claim 1, wherein certain chosen fields contained in each intercepted control packet, formatted according to the first protocol, including at least a service information field, are duplicated.

9. The method according to claim 8, wherein information data representing said duplicated service information field are communicated with the other duplicated fields.

10. The method according to claim 1, wherein the service information field comprises data representing a quality of service.

11. The method according to claim 4, wherein:
certain chosen fields contained in each intercepted control packet, formatted according to the first protocol and in which the service information field has a value greater than the said threshold value, are duplicated, and said duplicated fields are communicated; and
said detected network address field for the terminal which sent the packet, said detected network address field for the destination terminal of the packet, said detected destination port field, and said detected protocol number field are duplicated.

12. The method according to claim 1, wherein the whole of each intercepted control packet, formatted according to the first protocol, is duplicated.

13. A device for intercepting data exchanged by remote terminals, via a communications network, said data including packets formatted according to a first real-time data transfer control protocol and associated with data previously exchanged by said terminals, the device comprising:
interception means for intercepting at least certain data packets of a transfer between at least two remote terminals, during said transfer, and for determining amongst the intercepted data packets which of said data packets are control packets, said control packets being formatted according to said first protocol; and
management means for duplicating at least part of each of said intercepted control packets, and for generating data representing said duplicated part of each of said control packets, intended to be communicated to control means located in a control application of said network;
wherein said interception means are organized for detecting a service information field contained in each intercepted control packet, and for performing, between interception and duplication, a comparison between a stored chosen threshold value and the value of the detected service information field, so that the management means duplicate only the part at least of the control packet in which the service information field has a value greater than said threshold value;
wherein said interception means are organized for communicating to said management means certain chosen fields contained in each intercepted control packet in which the service information field has a value greater than said threshold value, and said management means are organized for duplicating said chosen fields of each intercepted control packet received and communicating said duplicated fields to said control means; and
wherein said interception means are organized for communicating said service information field to said management means, and said management means are organized for duplicating said service information field and communicating, with other duplicated fields, information data representing said duplicated service information field.

14. The device according to claim 13, wherein said interception means intercept all control packets transferred.

15. The device according to claim 14, wherein said interception means sample the control packets in the process of being transferred, and intercept only one sample from amongst n, n being a chosen integer value.

16. The device according to claim 13, wherein said interception means
detect from amongst the packets those in which at least a network address field for the terminal which sent the packet, a network address field for the destination terminal of the packet, a destination port field and/or a source port field, and a protocol number field have chosen values; and
retain the packets having said chosen values, these packets then being referred to as intercepted control packets.

17. The device according to claim 16, wherein said interception means are organized for receiving said chosen values from at least one of an application and an item of equipment in the network.

18. The device according to claim 13, wherein said interception means are organized for communicating to said management means the whole of each intercepted control packet in which the service information field has a value greater than said threshold value, and said management means are organized for duplicating the whole of each intercepted control packet received, and communicating to said control means the whole of said duplicated control packet.

19. The device according to claim 13, wherein one of the duplicated and communicated fields is said service information field.

20. The device according to claim 13, wherein said management means are organized for duplicating certain chosen fields contained in each intercepted control packet, formatted according to the first protocol, including at least a service information field.

21. The device according to claim 13, wherein said management means are organized for communicating information data, representing the said duplicated service information field, in addition to other duplicated fields.

22. The device according to claim 13, wherein the service information field comprises data representing the quality of service.

23. The device according to claim 16, wherein said interception means are organized for detecting a service information field contained in each intercepted control packet, and for performing, between interception and duplication, a comparison between a stored chosen threshold value and the value of the detected service information field, so that the management means duplicate only the part at least of the control packet in which the service information field has a value greater than the said threshold value; and said management means are organized for duplicating said network address field for the terminal which sent the intercepted packet, said network address field for the destination terminal of the intercepted control packet, said destination port field and said protocol number field, and for communicating said duplicated fields to the control means.

24. The device according to claim 13, wherein said management means are organized for duplicating the whole of each intercepted control packet, formatted according to the first protocol, and for communicating to said control means the whole of the said duplicated control packet.

25. The device according to claim 13, wherein said interception means are located in at least one of the items of network equipment through which the streams intended for the said terminals flow.

26. The device according to claim 13, wherein said management means are located in at least one of the items of equipment in the network to which the said terminals are connected.

27. The device according to claim 25, wherein the network equipment is chosen from a group comprising routers, NAT boxes, firewalls and traffic shapers.

28. The device according to claim 13, wherein said network is at least one of a public and a private network.

29. The device according to claim 28, wherein said network is the Internet.

30. The device according to claim 28, wherein the first protocol is called RTCP, and is associated with a real-time data transfer protocol called RTP.

31. The device according to claim 28, wherein the duplicated data are communicated according to a protocol chosen from a group comprising the COPS and SNMP protocols, and encapsulation protocols.

* * * * *